United States Patent
Eggert-Crowe

(10) Patent No.: US 10,895,494 B2
(45) Date of Patent: Jan. 19, 2021

(54) CHANGING TABLE, PLAY YARD ASSEMBLY WITH CHANGING TABLE AND METHOD OF MEASURING FEEDING INTAKE BY CHANGING TABLE

(71) Applicant: Wonderland Switzerland AG, Steinhausen (CH)

(72) Inventor: Colin F. Eggert-Crowe, Philadelphia, PA (US)

(73) Assignee: Wonderland Switzerland AG, Steinhausen (CH)

( * ) Notice: Subject to any disclaimer, the term of this patent is extended or adjusted under 35 U.S.C. 154(b) by 238 days.

(21) Appl. No.: 16/134,996

(22) Filed: Sep. 19, 2018

(65) Prior Publication Data
US 2019/0086254 A1   Mar. 21, 2019

Related U.S. Application Data

(60) Provisional application No. 62/561,252, filed on Sep. 21, 2017.

(51) Int. Cl.
| | |
|---|---|
| *G01G 19/52* | (2006.01) |
| *G01G 19/413* | (2006.01) |
| *G01G 19/44* | (2006.01) |
| *A47D 13/06* | (2006.01) |
| *A47D 5/00* | (2006.01) |
| *A47D 15/00* | (2006.01) |

(52) U.S. Cl.
CPC ............... *G01G 19/52* (2013.01); *A47D 5/00* (2013.01); *A47D 13/06* (2013.01); *A47D 15/00* (2013.01); *G01G 19/413* (2013.01); *G01G 19/445* (2013.01)

(58) Field of Classification Search
CPC ...... G01G 19/44; G01G 19/445; G01G 19/52; G01G 19/413; A47D 5/00; A47D 13/06; A47D 15/00
See application file for complete search history.

(56) References Cited

U.S. PATENT DOCUMENTS

| | | | | |
|---|---|---|---|---|
| 4,971,176 A | * | 11/1990 | Nojiri ............... | G01G 19/4144 177/245 |
| 5,376,761 A | * | 12/1994 | Koch ................... | G01G 19/445 177/126 |
| 7,235,746 B2 | * | 6/2007 | Williamson ........... | G01G 19/44 177/126 |

(Continued)

*Primary Examiner* — Randy W Gibson
(74) *Attorney, Agent, or Firm* — Winston Hsu

(57) ABSTRACT

A changing table is detachably installed on a play yard and capable of weighting a child. The changing table includes a frame, a weighting module and a fabric component. The frame includes a lower frame and an upper frame. The lower frame is detachably installed on the play yard. The upper frame is movably installed on the lower frame. The weighting module comprises four load sensors disposed on four corners of the frame and between the lower frame and the upper frame. The fabric component covers the upper frame to form a supporting area for supporting the child. The changing table can measure a first weight of the child before feeding the child and further measure a second weight of the child after feeding the child, so as to determine a difference of the second weight and the first weight of the child as the feeding intake.

18 Claims, 11 Drawing Sheets

(56) References Cited

U.S. PATENT DOCUMENTS

| | | | | |
|---|---|---|---|---|
| 7,475,593 | B2* | 1/2009 | Odom | E21B 47/10 |
| | | | | 73/152.55 |
| 10,527,484 | B2* | 1/2020 | Bottomly | G01G 19/52 |
| 2002/0005300 | A1* | 1/2002 | Saleem | G01G 5/045 |
| | | | | 177/144 |
| 2006/0054364 | A1* | 3/2006 | Kamakau | G01G 19/58 |
| | | | | 177/180 |
| 2012/0037432 | A1* | 2/2012 | Fiore, Jr. | A47D 9/00 |
| | | | | 177/45 |
| 2012/0259378 | A1* | 10/2012 | Heinrichs | G01G 19/52 |
| | | | | 607/6 |
| 2013/0327578 | A1* | 12/2013 | Roth | G01G 19/44 |
| | | | | 177/1 |
| 2016/0374516 | A1* | 12/2016 | Lammel | F21V 23/04 |
| | | | | 269/11 |
| 2018/0080810 | A1* | 3/2018 | Weiss | A47D 5/00 |

* cited by examiner

CHANGING TABLE, PLAY YARD ASSEMBLY WITH CHANGING TABLE AND METHOD OF MEASURING FEEDING INTAKE BY CHANGING TABLE

CROSS REFERENCE TO RELATED APPLICATIONS

This application claims the benefit of U.S. Provisional Patent Application No. 62/561,252, filed on Sep. 21, 2017, which is hereby incorporated by reference in its entirety.

BACKGROUND OF THE INVENTION

1. Field of the Invention

The present invention relates to a child product, and more particularly to a changing table, a play yard assembly with the changing table, and a method of measuring feeding intake by the changing table.

2. Description of the Prior Art

Using a weighting scale is a popular way to track a child's growth. Currently, caregivers who want to weight their children at home may buy a dedicated infant scale or a standard bathroom scale. However, these scales are typically single purpose products with no other use around the home. Furthermore, these products are usually made of hard plastic material, which makes children uncomfortable. Besides, the conventional scale does not offer a feature to measure a feeding intake of a child.

SUMMARY OF THE INVENTION

Therefore, it is an objective of the present invention to provide a changing table, a play yard assembly with the changing table, and a method of measuring feeding intake by the changing table for solving the aforementioned problem.

In order to achieve the aforementioned objective, the present invention discloses a changing table detachably installed on a play yard and capable of weighting a child. The changing table includes a frame, a weighting module and a fabric component. The frame includes a lower frame and an upper frame. The lower frame is detachably installed on the play yard. The upper frame is movably installed on the lower frame. The weighting module includes four load sensors disposed on four corners of the frame and between the lower frame and the upper frame. The fabric component covers the upper frame to form a supporting area between the upper frame and the lower frame for supporting the child.

According to an embodiment of the present invention, the lower frame includes a lower tube, a first lower housing and a second lower housing. The first lower housing is connected to an end of the lower tube. The second lower housing is connected to the other end of the lower tube. The upper frame includes a first upper tube, a second upper tube, a first upper housing and a second upper housing. The second upper tube is separated from the first upper tube. The first upper housing is connected to an end of the first upper tube and an end of the second upper tube. The first upper housing is movably installed on the first lower housing. The second upper housing is connected to the other end of the first upper tube and the other end of the second upper tube. The second upper housing is movably installed on the second lower housing. Two of the four load sensors are disposed between the first lower housing and the first upper housing, and the other two of the four load sensors are disposed between the second lower housing and the second upper housing.

According to an embodiment of the present invention, the lower frame includes at least one mounting portion for mounting on the play yard.

According to an embodiment of the present invention, the lower frame includes at least one supporting portion for supporting the changing table on a surface when the changing table is detached from the play yard.

According to an embodiment of the present invention, the weighting module further includes a display device disposed on the lower frame.

According to an embodiment of the present invention, the weighting module further includes at least one cable connected to the display device and at least one of the four load sensors.

According to an embodiment of the present invention, the at least one cable passes through the lower frame.

According to an embodiment of the present invention, the display device includes a monitor, a front cover, a rear cover and a circuit board. The front cover is fixed onto the lower frame. The monitor is installed on the front cover. The rear cover is detachably installed on the lower frame and the front cover. An accommodating space is formed between the front cover and the rear cover, and the circuit board is disposed inside the accommodating space and electrically connected to the monitor and the four load sensors.

According to an embodiment of the present invention, the rear cover includes at least one latch for engaging with the lower frame.

According to an embodiment of the present invention, the display device further includes a plurality of buttons and a battery holder. The plurality of buttons are separately installed on the front cover and electrically connected to the circuit board. The battery holder is disposed on the lower frame and away from the accommodating space and electrically connected to the circuit board.

According to an embodiment of the present invention, the four load sensors are fixed on the lower frame by screwing, and two first abutting bosses and two second abutting bosses protrude from the upper frame for abutting against the four load sensors disposed between the upper frame and the lower frame.

In order to achieve the aforementioned objective, the present invention further discloses a play yard assembly. The play yard assembly includes a play yard and a changing table. The changing table is detachably installed on the play yard and capable of weighting a child. The changing table includes a frame, a weighting module and a fabric component. The frame includes a lower frame and an upper frame. The lower frame is detachably installed on the play yard. The upper frame is movably installed on the lower frame. The weighting module includes four load sensors disposed on four corners of the frame and between the lower frame and the upper frame. The fabric component covers the upper frame to form a supporting area between the upper frame and the lower frame for supporting the child.

According to an embodiment of the present invention, the lower frame includes a lower tube, a first lower housing and a second lower housing. The first lower housing is connected to an end of the lower tube. The second lower housing is connected to the other end of the lower tube. The upper frame includes a first upper tube, a second upper tube, a first upper housing and a second upper housing. The second upper tube is separated from the first upper tube. The first upper housing is connected to an end of the first upper tube and an end of the second upper tube. The first upper housing is movably installed on the first lower housing. The second upper housing is connected to the other end of the first upper tube and the other end of the second upper tube. The second upper housing is movably installed on the second lower housing. Two of the four load sensors are disposed between the first lower housing and the first upper housing, and the other two of the four load sensors are disposed between the second lower housing and the second upper housing.

According to an embodiment of the present invention, the lower frame includes at least one mounting portion for mounting on the play yard and at least one supporting portion for supporting the changing table on a surface when the changing table is detached from the play yard.

According to an embodiment of the present invention, the weighting module further includes a display device and at least one cable. The display device is disposed on the lower frame. The at least one cable is connected to the display device and at least one of the four load sensors and passes through the lower frame.

According to an embodiment of the present invention, the display device includes a monitor, a front cover, a rear cover and a circuit board. The front cover is fixed onto the lower frame. The monitor is installed on the front cover. The rear cover is detachably installed on the lower frame and the front cover. An accommodating space is formed between the front cover and the rear cover, and the circuit board is disposed inside the accommodating space and electrically connected to the monitor and the four load sensors.

According to an embodiment of the present invention, the rear cover includes at least one latch for engaging with the lower frame.

According to an embodiment of the present invention, the display device further includes a plurality of buttons and a battery holder. The plurality of buttons are separately installed on the front cover and electrically connected to the circuit board. The battery holder is disposed inside the lower frame and away from the accommodating space and electrically connected to the circuit board.

According to an embodiment of the present invention, the four load sensors are fixed on the lower frame by screwing, and two first abutting bosses and two second abutting bosses protrude from the upper frame for abutting against the four load sensors disposed between the upper frame and the lower frame.

In order to achieve the aforementioned objective, the present invention further discloses a method of measuring a feeding intake by a changing table. The method includes placing a child into a supporting area of the changing table before feeding the child; four load sensors of a weighting module of the changing table measuring a first weight of the child in the supporting area of the changing table before feeding the child; removing the child from the supporting area of the changing table after measuring of the first weight of the child and then feeding the child; placing the child into the supporting area of the changing table after feeding the child; the four load sensors of the weighting module of the changing table measuring a second weight of the child in the supporting area of the changing table after feeding the child; the weighting module of the changing table determining a difference between the second weight and the first weight of the child; and a monitor of a display device of the weighting module of the changing table displaying the difference of the second weight and the first weight of the child as the feeding intake.

In summary, the changing table of the present invention utilizes the four load sensors disposed between the upper frame and the lower frame movable relative to each other to measure the weight of the child. Therefore, the changing table can measure the first weight of the child before feeding the child and further measure the second weight of the child after feeding the child, so as to calculate the difference of the second weight and the first weight of the child as the feeding intake. It is helpful for caregivers who are concerned about food intake of their children. Furthermore, the changing table can not only be installed on the play yard but also be removed from the play yard and placed on a ground or a table, which bring convenience in use. Besides, the changing table further utilizes the fabric component to support the child, which provides a comfortable environment for the child during measurement.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
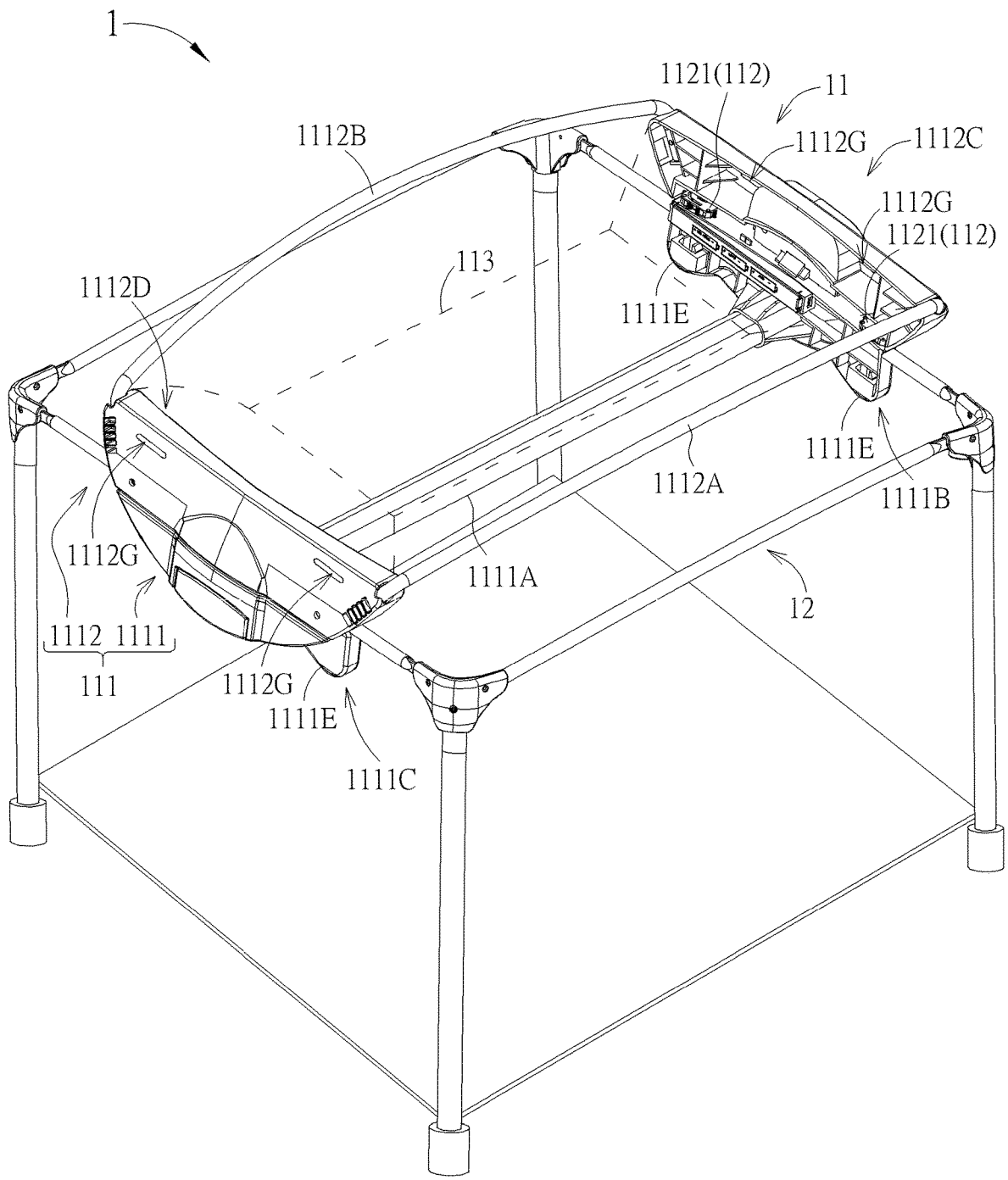
FIG. 1 is a schematic diagram of a play yard assembly according to an embodiment of the present invention.
Figure 2:
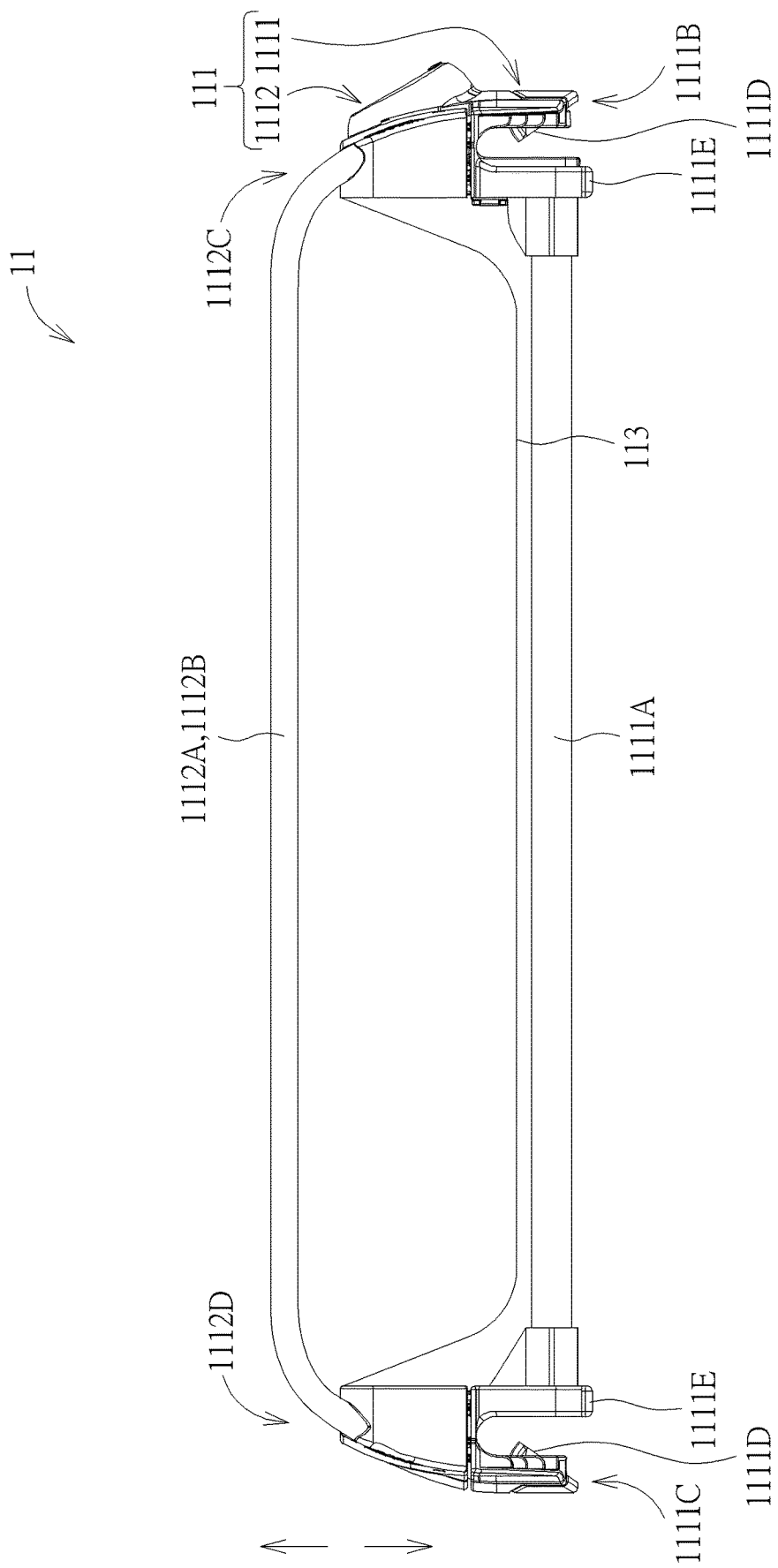
FIG. 2 and FIG. 3 are diagrams of a changing table at different views according to the embodiment of the present invention.
Figure 3:
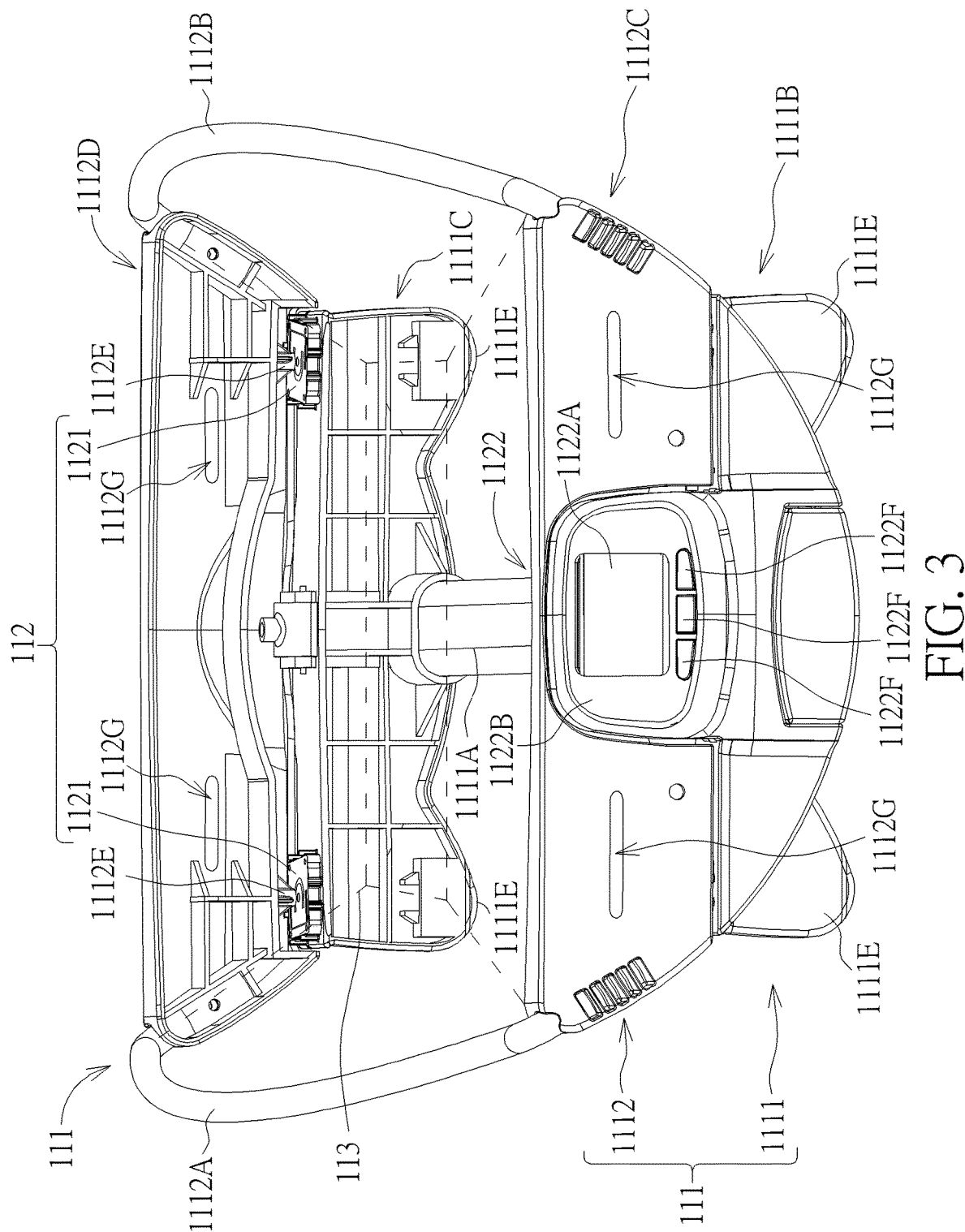
Figure 4:
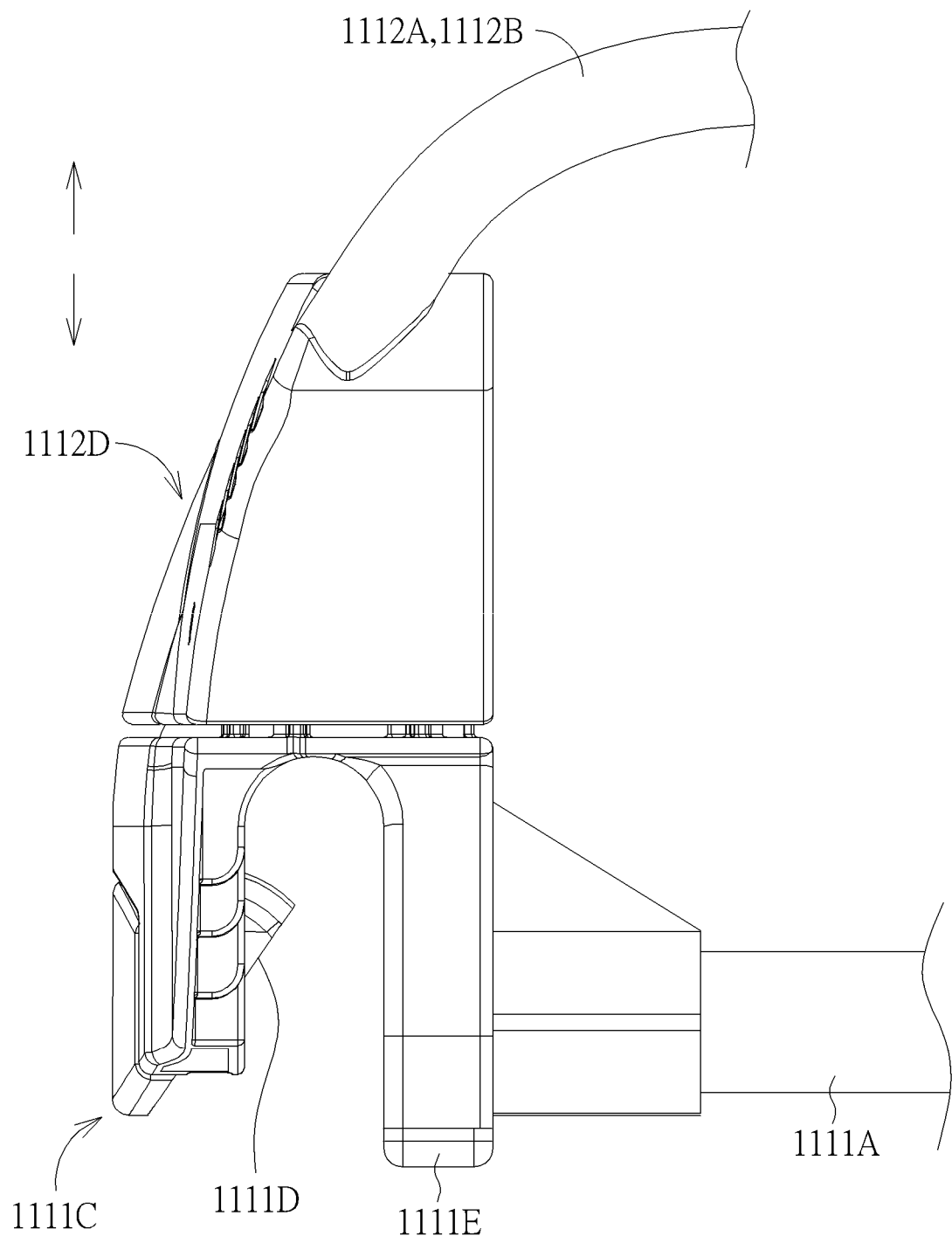
FIG. 4 is a partial enlarged diagram of the changing table shown in FIG. 2 according to the embodiment of the present invention.
Figure 5:
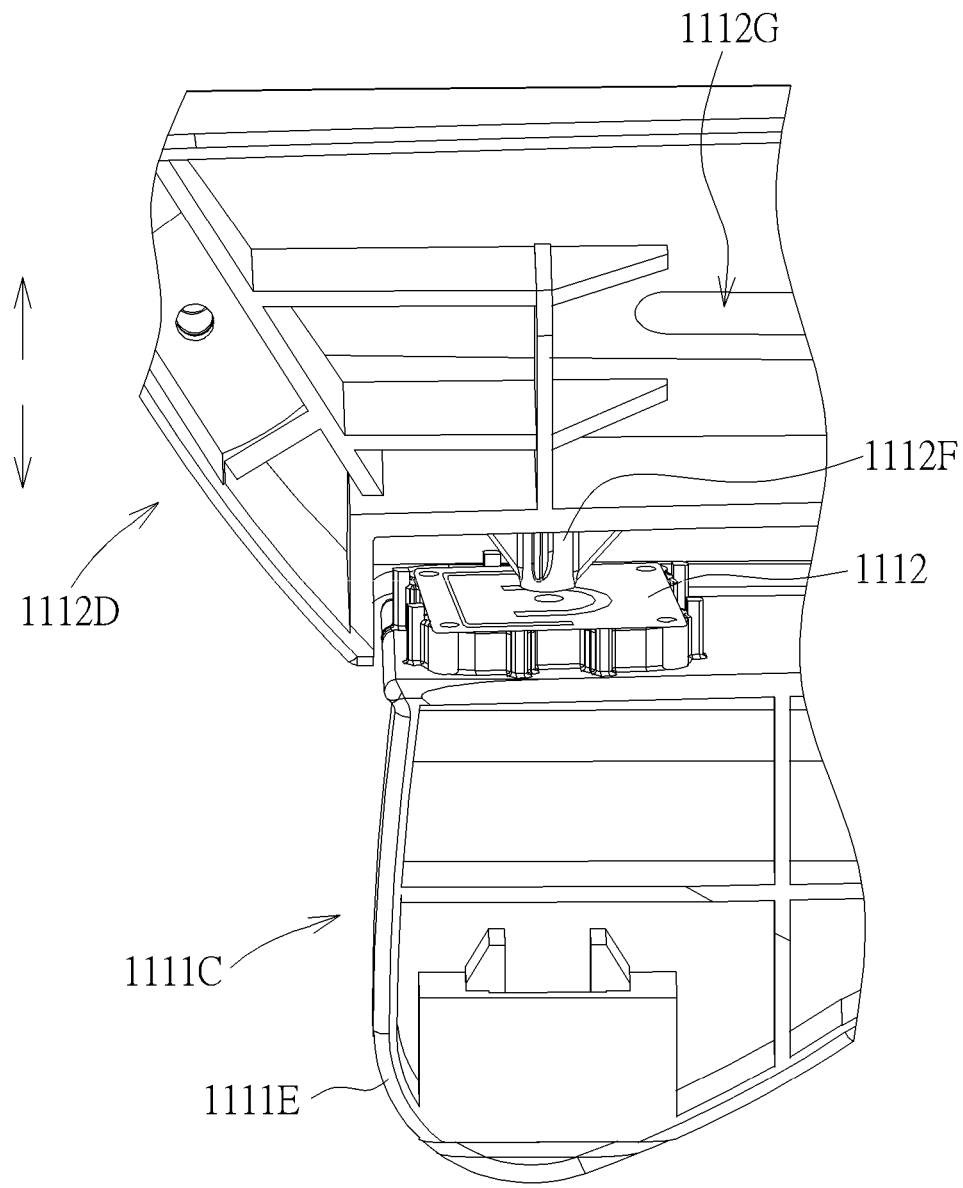
FIG. 5 is a partial enlarged diagram of the changing table shown in FIG. 3 according to the embodiment of the present invention.

Please refer to FIG. 1 to FIG. 5. FIG. 1 is a schematic diagram of a play yard assembly 1 according to an embodiment of the present invention. FIG. 2 and FIG. 3 are diagrams of a changing table 11 at different views according to the embodiment of the present invention. FIG. 4 is a partial enlarged diagram of the changing table 11 shown in FIG. 2 according to the embodiment of the present invention. FIG. 5 is a partial enlarged diagram of the changing table 11 shown in FIG. 3 according to the embodiment of the present invention. As shown in FIG. 1 to FIG. 5, the play yard assembly 1 includes the changing table 11 and a play yard 12. The changing table 11 is detachably installed on the play yard 12 and capable of weighting a child. The changing table 11 includes a frame 111, a weighting module 112 and a fabric component 113, which is shown in dashed lines. The frame 111 includes a lower frame 1111 and an upper frame 1112. The lower frame 1111 is detachably installed on the play yard 12. The upper frame 1112 is movably installed on the lower frame 1111. The fabric component 113 covers the upper frame 1112 to form a supporting area between the upper frame 1112 and the lower frame 1111 for supporting the child. For example, the fabric component 113 can be detachably hung on or fixedly connected to the upper frame 1112 and separated from the lower frame 1111.

Specifically, the lower frame 1111 includes a lower tube 1111A, a first lower housing 1111B and a second lower housing 1111C. The first lower housing 1111B is connected to an end of the lower tube 1111A. The second lower housing 1111C is connected to the other end of the lower tube 1111A. The upper frame 1112 includes a first upper tube 1112A, a second upper tube 1112B, a first upper housing 1112C and a second upper housing 1112D. The first upper tube 1112A and the second upper tube 1112B are separated from each other and located at two opposite sides of the changing table 11. The first upper housing 1112C is connected to an end of the first upper tube 1112A and an end of the second upper tube 1112B. The first upper housing 1112C is movably installed on the first lower housing 1111B and movable relative to the first lower housing 1111B along a vertical direction. The second upper housing 1112D is connected to the other end of the first upper tube 1112A and the other end of the second upper tube 1112B. The second upper housing 1112D is movably installed on the second lower housing 1111C and movable relative to the second lower housing 1111C along the vertical direction.

In this embodiment, two slots 1112G can be preferably formed on each of the first upper housing 1112C and the second supper housing 1112D for fixing the fabric component 113 smoothly.

Furthermore, each of the first lower housing 1111B and the second lower housing 1111C of the lower frame 1111 includes a mounting portion 1111D for mounting on the play yard 12 and a supporting portion 1111E for supporting the changing table 11 on a surface, such as a table surface or a ground surface, after the changing table 11 is detached from the play yard 12. In other words, the changing table 11 and the play yard 12 of the present invention can be used together or independently. However, the numbers and the configurations of the mounting portion and the supporting portion are not limited to those illustrated in the figures. It depends on practical demands.

Figure 6:
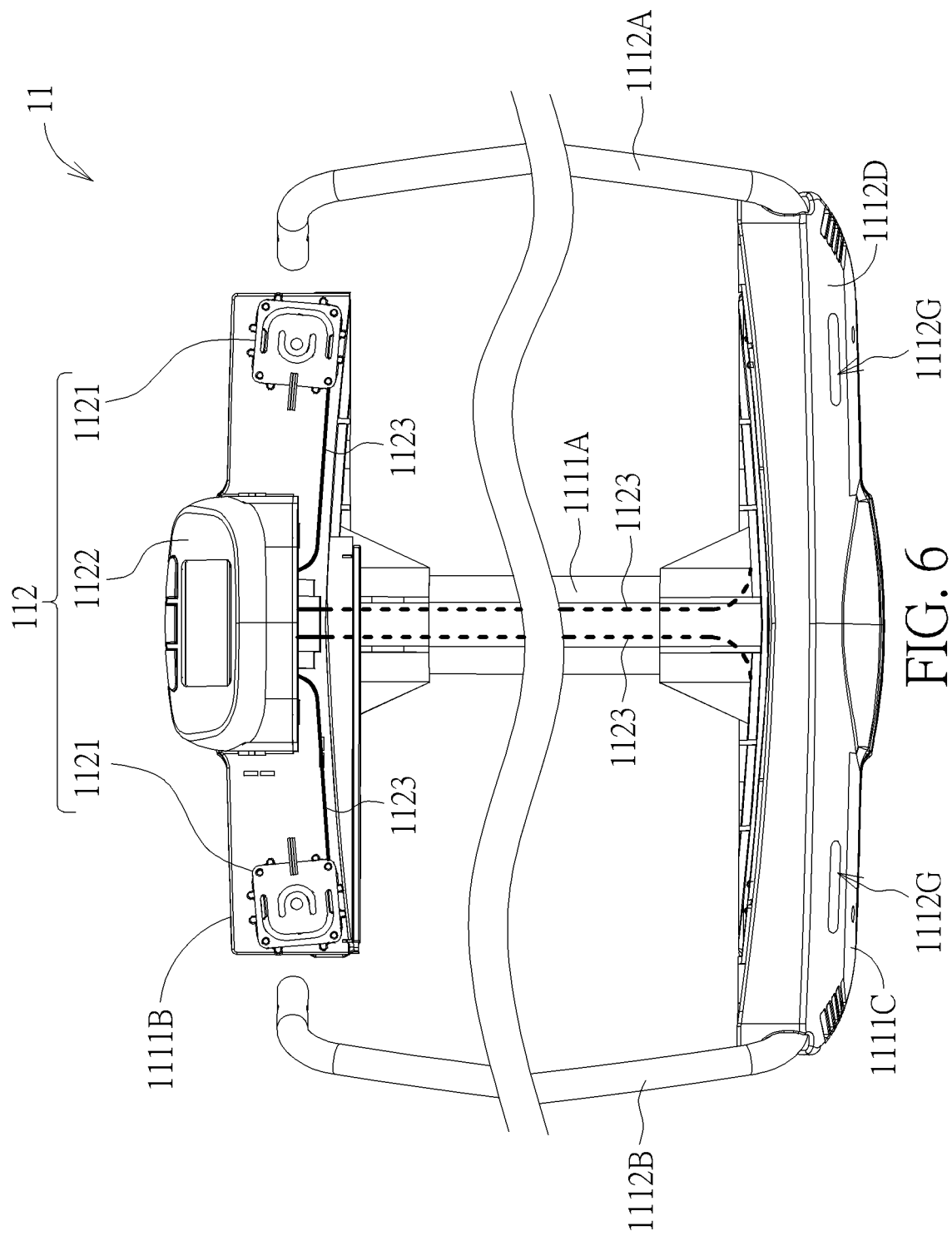
FIG. 6 and FIG. 7 are partial diagrams of the changing table at different views according to the embodiment of the present invention.
Figure 7:
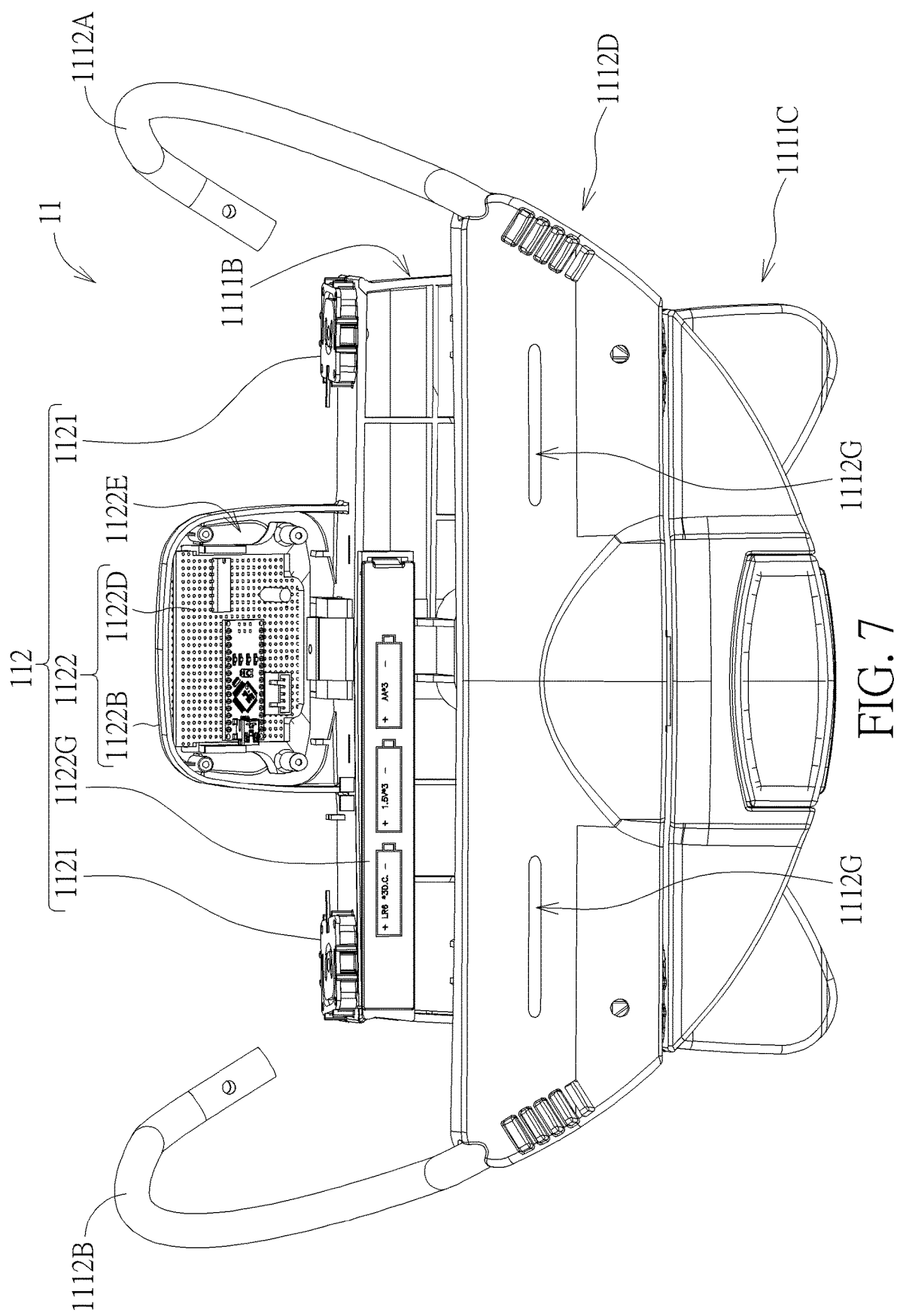
Figure 8:
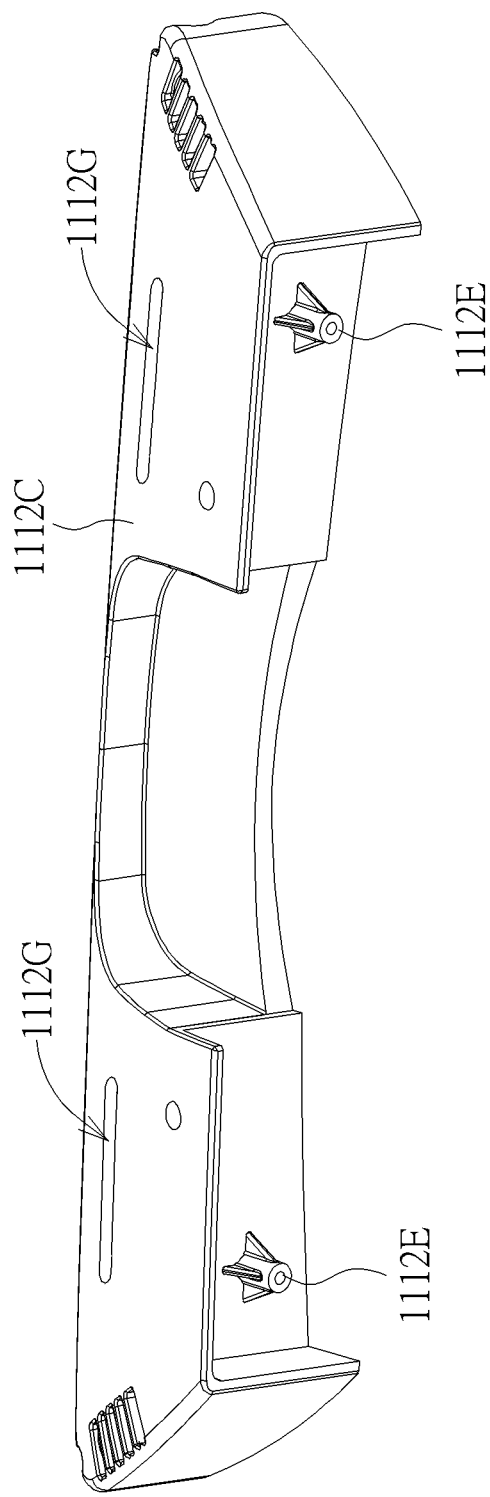
FIG. 8 is a diagram of a first upper housing according to the embodiment of the present invention.
Figure 9:
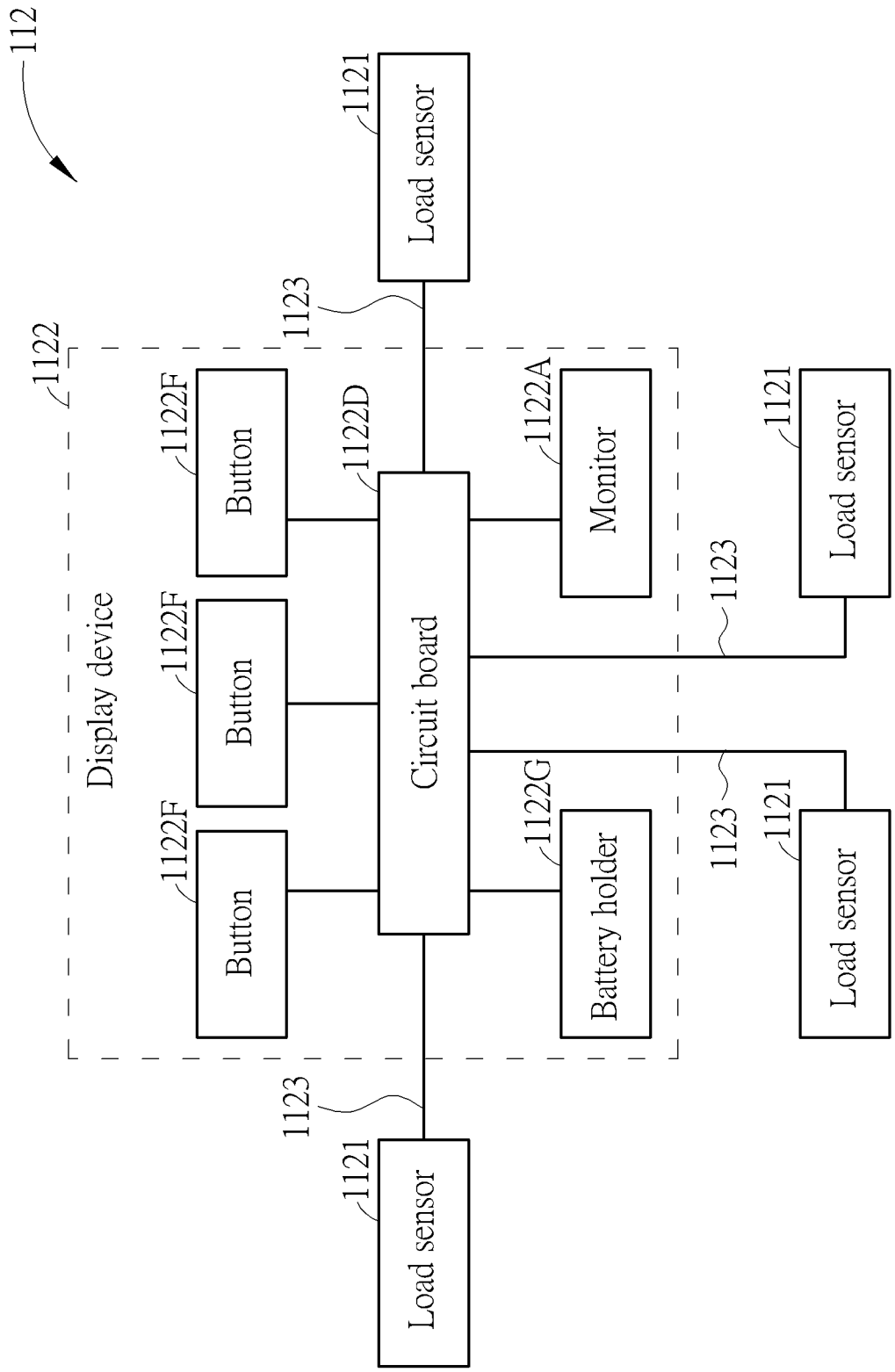
FIG. 9 is a functional block diagram of a weighting module according to the embodiment of the present invention.

Please refer to FIG. 2 to FIG. 9. FIG. 6 and FIG. 7 are partial diagrams of the changing table 11 at different views according to the embodiment of the present invention. FIG. 8 is a diagram of the first upper housing 1112C according to the embodiment of the present invention. FIG. 9 is a functional block diagram of the weighting module 112 according to the embodiment of the present invention. As shown in FIG. 2 to FIG. 8, the weighting module 112 includes four load sensors 1121, a display device 1122 and four cables 1123. The four load sensors 1121 are disposed on four corners of the frame 111 and between the lower frame 1111 and the upper frame 1112. Specifically, two of the four load sensors 1121 are disposed on the first lower housing 1111B and located between the first lower housing 1111B and the first upper housing 1112C, and the other two of the four load sensors 1121 are disposed on the second lower housing 1111C and located between the second lower housing 1111C and the second upper housing 1112D. Furthermore, two first abutting bosses 1112E protrude from the first upper housing 1112C of the upper frame 1112 for abutting against the corresponding two load sensors 1121 fixed on the first lower housing 1111B of the lower frame 1111, and two second abutting bosses 1112F protrude from the second upper housing 1112D of the upper frame 1112 for abutting against the corresponding two load sensors 1121 fixed on the second lower housing 1111C of the lower frame 1111. In such a way, when the child is placed on the changing table 11 and supported by the fabric component 113, the upper frame 1112 is forced to move relative to the lower frame 1111 downwardly, so that the two first abutting bosses 1112E and the two second abutting bosses 1112F can press the four load sensors 1121 to weight the child. The numbers and the configurations of the load sensors and the abutting bosses are not limited to those illustrated in this embodiment. It depends on practical demands. For example, the load sensors can be installed on the lower frame 1111 and located on a plane evenly for measuring the child's weight precisely.

In this embodiment, the four load sensors 1121 can preferably be fixed on the first lower housing 1111B and the second lower housing 1111C of the lower frame 1111 by screwing, which allows the first abutting bosses 1112E and the second abutting bosses 1112F to evenly press the four load sensors 1121 to prevent a measurement error due to an uneven load.

Furthermore, the display device 1122 is disposed on the first lower housing 1111B of the lower frame 1111. The four cables 1123 are connected to the display device 1122 and the four load sensors 1121. In this embodiment, two of the four cables 1123 connected to the two load sensors 1121 fixed on the second lower housing 1111C can pass through the lower tube 1111A of the lower frame 1111 for hiding the two of the four cables 1123 so as to prevent a potential hazard of the exposed cable 1123.

Figure 10:
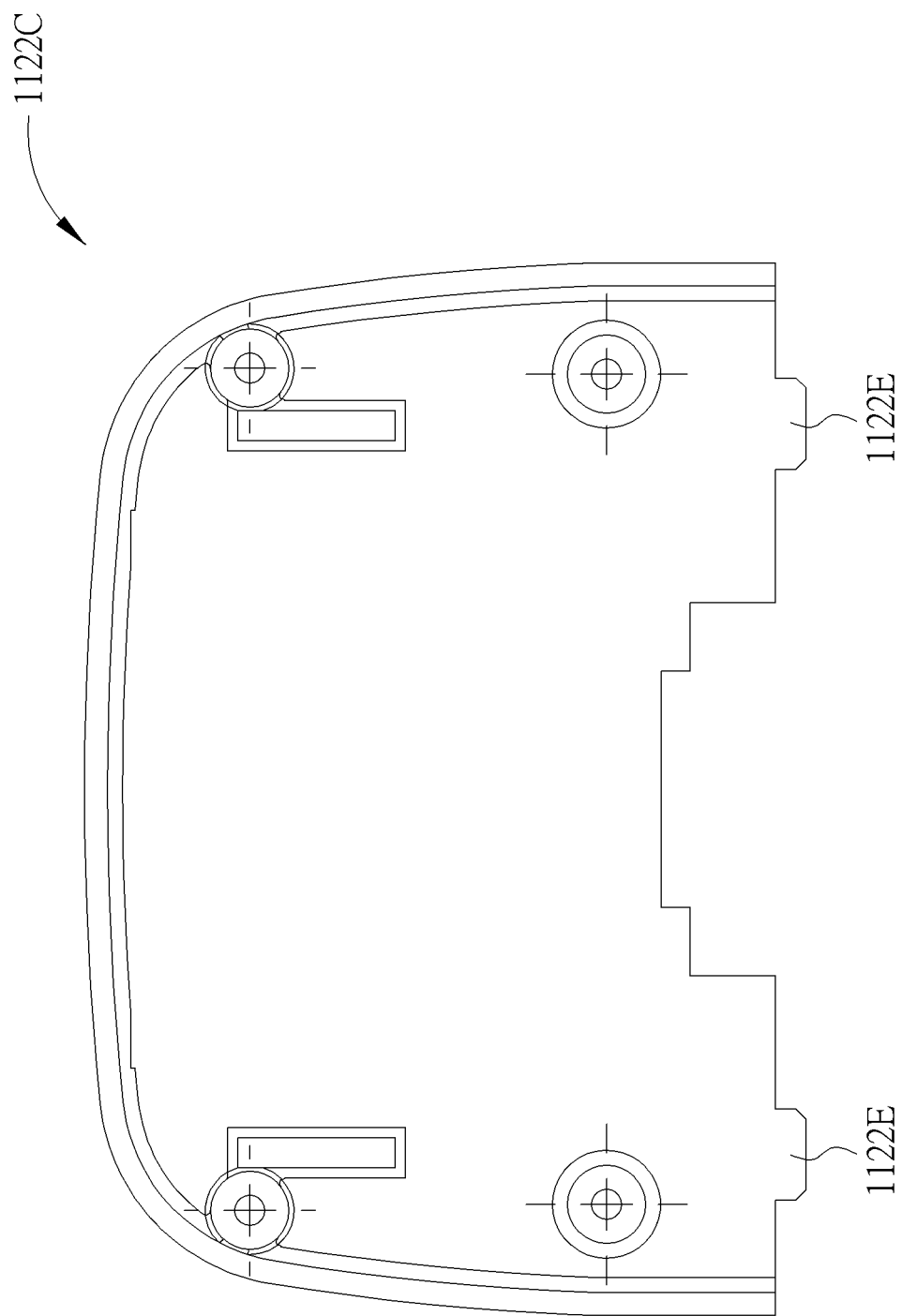
FIG. 10 is a rear cover of a display device according to the embodiment of the present invention.

Please refer to FIG. 3, FIG. 7, FIG. 9 and FIG. 10. FIG. 10 is a rear cover 1122C of the display device 1122 according to the embodiment of the present invention. As shown in FIG. 3, FIG. 7, FIG. 9 and FIG. 10, the display device 1122 includes a monitor 1122A, a front cover 1122B, the rear cover 1122C and a circuit board 1122D. The front cover 1122B is fixed onto the first lower housing 1111B of the lower frame 1111. The monitor 1122A is installed on the front cover 1122B. The rear cover 1122C is detachably installed on the first lower housing 1111B of the lower frame 1111 and the front cover 1122B. An accommodating space 1122E is formed between the front cover 1122B and the rear cover 1122C. The circuit board 1122D is disposed inside the accommodating space 1122E and electrically connected to the monitor 1122A and the four load sensors 1121. In other words, the four cables 1123 are connected to the circuit board 1122D of the display device 1122 and the four load sensors 1121.

In this embodiment, the rear cover 1122C can preferably include two latches 1122E for engaging with the first lower housing 1111B of the lower frame 1111, which can reduce fixing components, such as fixing bosses, for fixing the front cover 1122B and the rear cover 1122C to prevent interference between the circuit board 1122D and the fixing components and allow the accommodating space 1122E to be utilized more efficiently.

Furthermore, the display device 1122 can further include three buttons 1122F and a battery holder 1122G. In this embodiment, the three buttons 1122F are electrically connected to the circuit board 1122D. The battery holder 1122G is disposed on the lower frame 1111 and electrically connected to the circuit board 1122D for accommodating batteries. In this embodiment, the plurality of buttons 1122F can preferably be separately installed on the front cover 1122B to prevent interference between the two adjacent buttons 1122F during operation. Furthermore, the battery holder 1122G can be preferably disposed on the first lower housing 1111B and away from the accommodating space 1122E for easy replacement of the batteries.

Figure 11:
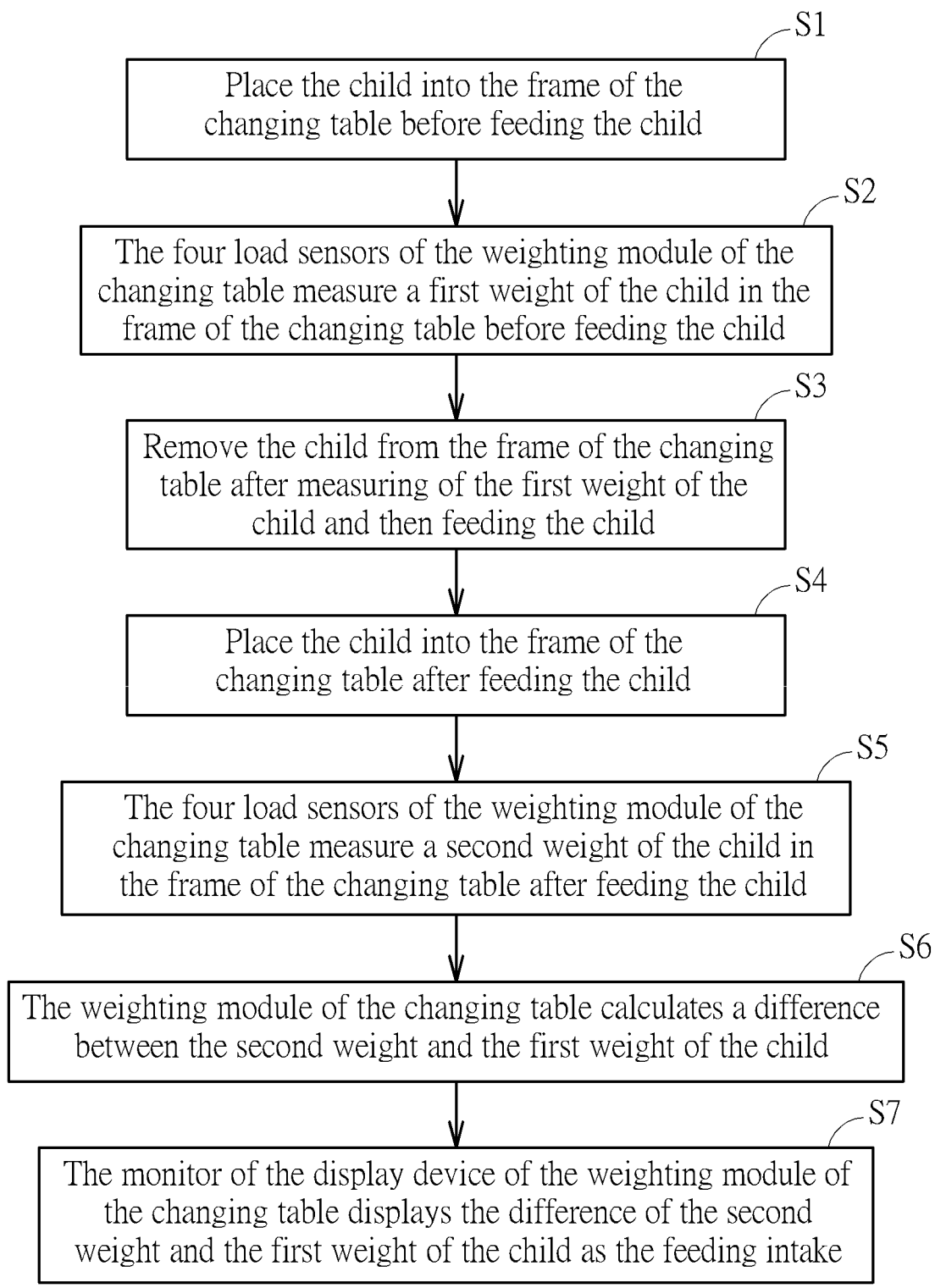
FIG. 11 is a flow chart diagram illustrating a method of measuring a feeding intake by the changing table according to the embodiment of the present invention.

Please refer to FIG. 11. FIG. 11 is a flow chart diagram illustrating a method of measuring a feeding intake by the changing table 11 according to the embodiment of the present invention. As shown in FIG. 11, the method includes the following step:

S1: Place the child into the supporting area of the changing table 11 before feeding the child;

S2: The four load sensors 1121 of the weighting module 112 of the changing table 11 measure a first weight of the child in the supporting area of the changing table 11 before feeding the child;

S3: Remove the child from the supporting area of the changing table 11 after measuring of the first weight of the child and then feeding the child;

S4: Place the child into the supporting area of the changing table 11 after feeding the child;

S5: The four load sensors 1121 of the weighting module 112 of the changing table 11 measure a second weight of the child in the supporting area of the changing table 11 after feeding the child;

S6: The weighting module 112 of the changing table 11 calculates a difference between the second weight and the first weight of the child; and S7: The monitor 1122A of the display device 1122 of the weighting module 112 of the changing table 11 displays the difference of the second weight and the first weight of the child as the feeding intake.

More detailed description for the steps of the method is provided as follows. When it is desired for caregivers to track the feeding intake of the child, the caregivers can be prompted to place the child into the supporting area of the changing table 11 to measure the first weight of the child by the monitor 1122A before feeding the child (steps S1 and S2). When the first weight of the child is measured by the four load sensors 1121, the caregiver can be prompted to remove the child and begin feeding the child by the monitor 1122A (step S3). Afterwards, the caregiver can be further prompted to place the child back into the supporting area again to measure the second weight of the child by the monitor 1122A after feeding the child (steps S4 and S5). When the second weight of the child is measured by the four load sensors 1121, the weighting module 112 can calculate the difference between the second weight and the first weight of the child as the feeding intake and control the monitor 1122A to display the feeding intake. Therefore, the present invention makes it simple for the caregivers who want to track the feeding intake of the child.

In contrast to the prior art, the changing table of the present invention utilizes the four load sensors disposed between the upper frame and the lower frame movable relative to each other to measure the weight of the child. Therefore, the changing table can measure the first weight of the child before feeding the child and further measure the second weight of the child after feeding the child, so as to calculate the difference of the second weight and the first weight of the child as the feeding intake. It is helpful for caregivers who are concerned about food intake of their children. Furthermore, the changing table can not only be installed on the play yard but also be removed from the play yard and placed on a ground or a table, which bring convenience in use. Besides, the changing table further utilizes the fabric component to support the child, which provides a comfortable environment for the child during measurement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A changing table detachably installed on a play yard and capable of weighting a child, the changing table comprising:
    a frame comprising:
        a lower frame detachably installed on the play yard, the lower frame comprising at least one supporting portion for supporting the changing table on a surface when the changing table is detached from the play yard; and;
        an upper frame movably installed on the lower frame;
    a weighting module comprising four load sensors disposed on four corners of the frame and between the lower frame and the upper frame; and
    a fabric component covering the upper frame to form a supporting area between the upper frame and the lower frame for supporting the child.

2. The changing table of claim 1, wherein the lower frame further comprises a lower tube, a first lower housing and a second lower housing, the lower tube is under the supporting area, the first lower housing is connected to an end of the lower tube, the second lower housing is connected to the other end of the lower tube, the upper frame comprises a first upper tube, a second upper tube, a first upper housing and a second upper housing, the second upper tube is separated from the first upper tube, the first upper housing is connected to an end of the first upper tube and an end of the second upper tube, the first upper housing is movably installed on the first lower housing, the second upper housing is connected to the other end of the first upper tube and the other end of the second upper tube, the second upper housing is movably installed on the second lower housing, two of the four load sensors are disposed between the first lower housing and the first upper housing, and the other two of the four load sensors are disposed between the second lower housing and the second upper housing.

3. The changing table of claim 1, wherein the lower frame further comprises at least one mounting portion for mounting on the play yard.

4. The changing table of claim 1, wherein the weighting module further comprises a display device disposed on the lower frame.

5. The changing table of claim 4, wherein the weighting module further comprises at least one cable connected to the display device and at least one of the four load sensors.

6. The changing table of claim 5, wherein the at least one cable passes through the lower frame.

7. The changing table of claim 4, wherein the display device comprises a monitor, a front cover, a rear cover and a circuit board, the front cover is fixed onto the lower frame, the monitor is installed on the front cover, the rear cover is detachably installed on the lower frame and the front cover, an accommodating space is formed between the front cover and the rear cover, and the circuit board is disposed inside the accommodating space and electrically connected to the monitor and the four load sensors.

8. The changing table of claim 7, wherein the rear cover comprises at least one latch for engaging with the lower frame.

9. The changing table of claim 7, wherein the display device further comprises a plurality of buttons and a battery holder, the plurality of buttons are separately installed on the front cover and electrically connected to the circuit board, the battery holder is disposed on the lower frame and away from the accommodating space and electrically connected to the circuit board.

10. The changing table of claim 1, wherein the four load sensors are fixed on the lower frame by screwing, and two first abutting bosses and two second abutting bosses protrude from the upper frame for abutting against the four load sensors disposed between the upper frame and the lower frame.

11. A play yard assembly comprising:
a play yard; and
a changing table detachably installed on the play yard and capable of weighting a child, the changing table comprising:
  a frame comprising:
    a lower frame detachably installed on the play yard, the lower frame comprising at least one supporting portion for supporting the changing table on a surface when the changing table is detached from the play yard; and
    an upper frame movably installed on the lower frame;
  a weighting module comprising four load sensors disposed on four corners of the frame and between the lower frame and the upper frame; and
  a fabric component covering the upper frame to form a supporting area between the upper frame and the lower frame for supporting the child.

12. The play yard assembly of claim 11, wherein the lower frame further comprises a lower tube, a first lower housing and a second lower housing, the lower tube is under the supporting area, the first lower housing is connected to an end of the lower tube, the second lower housing is connected to the other end of the lower tube, the upper frame comprises a first upper tube, a second upper tube, a first upper housing and a second upper housing, the second upper tube is separated from the first upper tube, the first upper housing is connected to an end of the first upper tube and an end of the second upper tube, the first upper housing is movably installed on the first lower housing, the second upper housing is connected to the other end of the first upper tube and the other end of the second upper tube, the second upper housing is movably installed on the second lower housing, two of the four load sensors are disposed between the first lower housing and the first upper housing, and the other two of the four load sensors are disposed between the second lower housing and the second upper housing.

13. The play yard assembly of claim 11, wherein the lower frame further comprises at least one mounting portion for mounting on the play yard.

14. The play yard assembly of claim 11, wherein the weighting module further comprises:
a display device disposed on the lower frame; and
at least one cable connected to the display device and at least one of the four load sensors and passing through the lower frame.

15. The play yard assembly of claim 14, wherein the display device comprises a monitor, a front cover, a rear cover and a circuit board, the front cover is fixed onto the lower frame, the monitor is installed on the front cover, the rear cover is detachably installed on the lower frame and the front cover, an accommodating space is formed between the front cover and the rear cover, and the circuit board is disposed inside the accommodating space and electrically connected to the monitor and the four load sensors.

16. The play yard assembly of claim 15, wherein the rear cover comprises at least one latch for engaging with the lower frame.

17. The play yard assembly of claim 15, wherein the display device further comprises a plurality of buttons and a battery holder, the plurality of buttons are separately installed on the front cover and electrically connected to the circuit board, the battery holder is disposed inside the lower frame and away from the accommodating space and electrically connected to the circuit board.

18. The play yard assembly of claim 11, wherein the four load sensors are fixed on the lower frame by screwing, and two first abutting bosses and two second abutting bosses protrude from the upper frame for abutting against the four load sensors disposed between the upper frame and the lower frame.

* * * * *